June 11, 1963
M. R. CINES
3,093,626
POLYMERIZATION PROCESS AND APPARATUS
Filed May 27, 1955
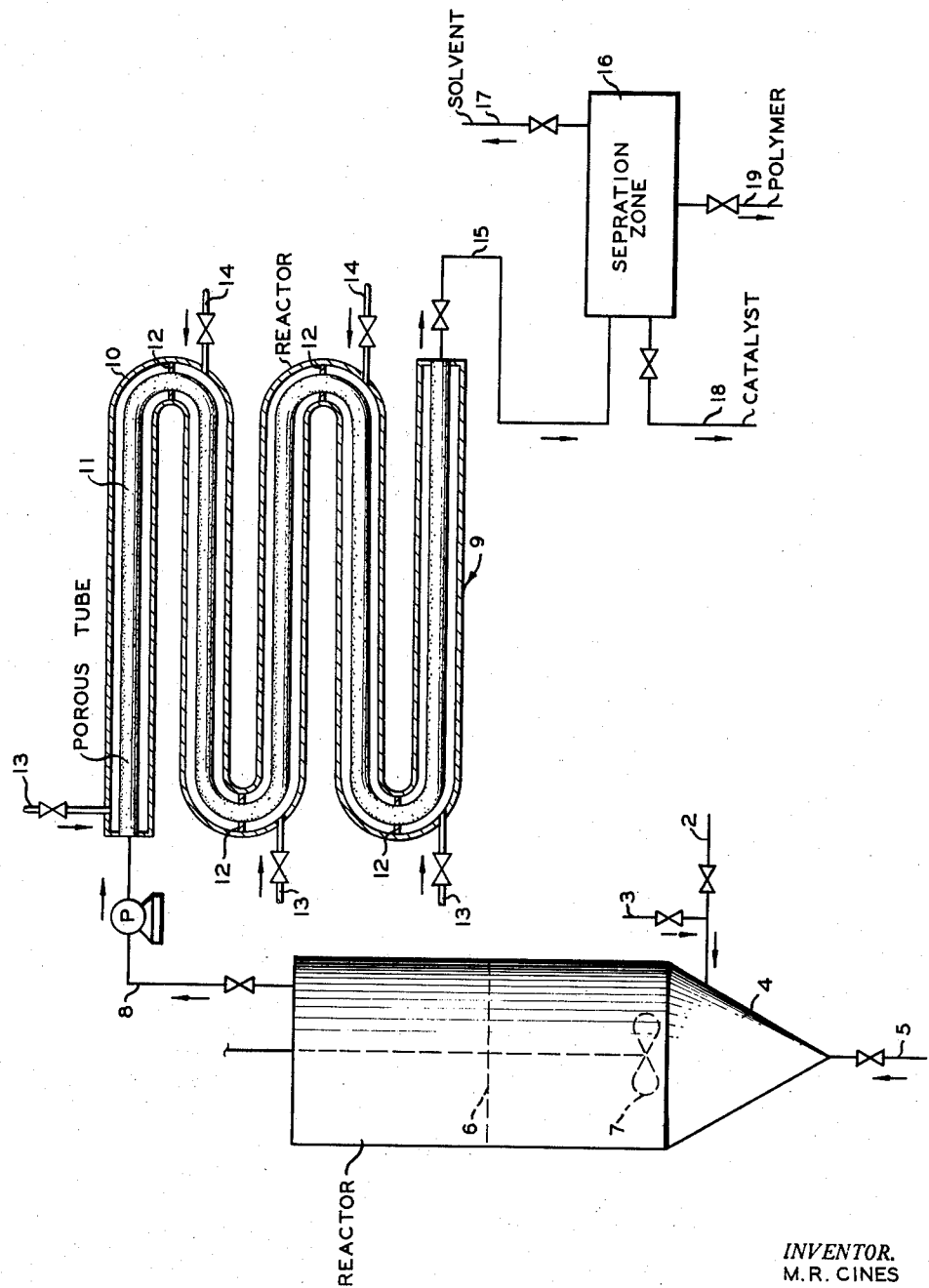
INVENTOR.
M.R. CINES
BY
Hudson and Young
ATTORNEYS United States Patent Office 3,093,626
Patented June 11, 1963

3,093,626
POLYMERIZATION PROCESS AND APPARATUS
Martin R. Cines, Bartlesville, Okla., assignor to Phillips Petroleum Company, a corporation of Delaware
Filed May 27, 1955, Ser. No. 511,694
5 Claims. (Cl. 260—94.9)

This invention relates to the polymerization of olefins, especially to form normally solid polymers. In one aspect, it relates to a process for increasing the yield of polymer per unit weight of catalyst. In another aspect, it relates to a novel apparatus for use in conducting a polymerization reaction.

It has recently been found that normally solid polymers can be produced by polymerizing monomeric olefins in the presence of solid contact catalysts at moderately elevated temperatures and pressures. The copending application of Hogan and Banks, Serial No. 476,306, filed December 20, 1954, which is a continuation-in-part of application Serial No. 333,576, filed January 27, 1953, both abandoned, discloses such a process. As discussed more fully in said applications, an aliphatic 1-olefin having a maximum carbon chain length of 8 carbon atoms and no branching nearer the double bond than the 4-position is contacted with a catalyst comprising, as an essential ingredient, chromium oxide, of which a substantial proportion of the chromium is hexavalent, associated with at least one additional material, especially silica, alumina, thoria, or zirconia. The chromium content of the catalyst is ordinarily a minor proportion thereof and is usually in the range 0.1 to 10 weight percent. The contacting is usually, but not necessarily, conducted with the reactant olefin in admixture with a hydrocarbon solvent or diluent which is inert and liquid under the polymerization conditions. As such hydrocarbon solvents, paraffins and naphthenes having from 5 to 12 carbon atoms per molecule are generally suitable. The polymerization temperature is ordinarily in the range 150 to 450° F., and the pressure is sufficient to maintain the diluent or solvent substantially in the liquid phase. The catalyst can be used in the form of a fixed bed or in mobile form.

A satisfactory method for conducting the polymerization reaction is to maintain the catalyst in suspension in the solvent, and introduce the olefin into the resulting slurry, reaction mixture being withdrawn from the reactor and treated for the recovery of polymer. It has been found that the catalyst particles disintegrate and form fines under the reaction conditions. The fines are withdrawn in suspension in the effluent and are often discarded.

The present invention provides a method and an apparatus for utilizing the fines and increasing the yield of polymer per unit weight of catalyst.

According to this invention, an olefin polymerizable to normally solid polymer in the presence of a solid contact catalyst is so polymerized, the catalyst being maintained in suspension in particulate form in the reaction mixture; the polymer-containing reaction mixture is treated for removal of the coarser catalyst particles; the partially clarified mixture thus obtained containing suspended fines is subjected to polymerization conditions whereby the polymerization reaction is continued in the presence of the catalyst fines, which are thus utilized to catalyze the formation of further amounts of polymer and thereby increase the yield of polymer per unit weight of catalyst. Additional amounts of olefin monomer can be, and preferably are, added to the fines-containing mixture and reacted to form additional polymer.

Although the invention is not limited to liquid-phase reaction, an advantageous application thereof is to liquid-phase operation, which is a frequently preferred mode of conducting the polymerization. When the polymerization is conducted in the liquid phase, it is often preferred to utilize the catalyst in the form of a slurry or suspension in a hydrocarbon diluent of the type already mentioned herein and discussed in more detail in the cited copending applications of Hogan and Banks and in the copending application of W. C. Lanning, Serial No. 450,225, filed August 16, 1954, now abandoned. The suspension can be maintained in the first step or main reaction zone by means of a mechanically driven stirrer or by the fluidizing or jet action of incoming reactant and/or solvent or by both methods.

The second step is the removal of the coarser catalyst particles from the reaction mixture. This can be done by filtration, centrifugation, or any other suitable method known in the art, but is preferably done by causing the coarser particles to settle from the fluid phase. This settling can be effected in a separate container, but is preferably conducted in a quiescent or nonturbulent section of the main reactor, usually an upper section thereof.

The third step, or after-reaction step, in which the catalyst is present substantially entirely as fines, can be conducted in substantially the same manner and under substantially the same conditions as the main reaction, but is preferably conducted in a zone of turbulent flow wherein the turbulence is produced chiefly by the linear velocity of the reaction mixture, the catalyst fines being readily maintainable in suspension in the fluid phase. Additional olefin is preferably added to the after-reactor and can suitably be added incrementally or multipointwise along the line of flow.

Since the addition of olefin in the after-reactor increases the concentration of polymer in the reaction mixture and the increased concentration is accompanied by an increase in viscosity, it is often desirable to add further quantities of solvent in the after-reaction zone. It is desirable to maintain the polymer concentration below 10 weight percent, and preferably below 5 weight percent.

The drawing illustrates one embodiment of the invention. A liquid hydrocarbon solvent, such as cyclohexane, enters the system through inlet 2. Comminuted catalyst, e.g., 10 to 50 mesh, is added to the cyclohexane, from a source, not shown, through inlet 3 to form a slurry or suspension of the catalyst in the cyclohexane. The catalyst can comprise, for example, 2 weight percent chromium in the form of chromium oxide supported on a coprecipitated gel composite comprising 90 weight percent silica and 10 weight percent alumina. The cyclohexane is preferably pretreated to remove impurities such as dissolved water, oxygen, and sulfur compounds. The slurry passes into reactor 4, which can be a metal, fluid-tight container. Ethylene enters the reaction through inlet 5. The ethylene can enter reactor 4 at a velocity sufficiently high to maintain the catalyst in suspension in the reactor contents as a dense-phase fluidized bed having an upper boundary indicated as 6. Alternatively, the suspension can be maintained by means of a mechanical stirrer 7 driven by a motor, not shown; or both a stirrer and jet agitation, produced by entering ethylene, can be utilized. In any event, below 6 the catalyst is maintained under hindered-settling conditions as a dense, ebullient phase. It will be understood by those skilled in the art that the "phase boundary" 6 is somewhat less definite than the boundary between two liquid phases. Nevertheless, there is a marked catalyst concentration difference between the lower and the upper part of the reaction space.

As a result of attrition and the deposition and expansion of polymer in the pores of the catalyst, disintegration and spalling of the catalyst occur during the reaction. The fines thus produced are elutriated and thus separated from the bulk of the coarser catalyst particles and are carried in suspension into the relatively quiescent zone of the reactor above boundary 6. The particle size of the fines is ordinarily less than about 100 mesh. However, the particle size can be larger or smaller, and the separation between coarse and fine catalysts can be made at any desired particle size by adjustment of the effective velocity of flow through the reactor.

Slurry of the coarse catalyst can be continuously or intermittently withdrawn from the bottom of reactor 4, by means not shown in the drawing, and treated for recovery of polymer, including polymer deposited on the catalyst, suitable recovery methods being subsequently discussed in connection with the effluent from reactor 9. However, it is often preferred that the total amount of withdrawn catalyst be that removed in the effluent in the form of fines.

Crude reaction product or effluent comprising polyethylene, catalyst fines, cyclohexane and unreacted ethylene in admixture is possed through conduit 8 to reactor 9.

Reactor 9 has the general configuration of a turbulence coil, i.e., it can contain one or more bends and is of relatively small effective cross-section so that turbulence of fluid flowing through the reactor is easily attainable by proper choice of flow velocity, as is well understood in the art. Reactor 9 comprises an outer shell 10 and inner reaction tube 11. Shell 10 can be constructed of any suitable material, such as metal, and is fluid-tight. The inner reaction tube 11 is permeable or porous so that material can flow from the annulus between tubes 11 and 10 into the interior of tube 11 by suitable application of pressure in said annulus. Tube 11 can be constructed of any suitable permeable material, such as sintered metal, porous refractory, or perforate metal. It is preferred that the openings which render tube 11 porous be sufficiently small that fluid can be readily forced from tube 10 into tube 11 at a relatively high linear velocity. Tube 11 or part thereof can, if desired, be so constructed that the diameter increases in the direction of flow. Positioned within the annulus between the two tubes are several fluid-tight partitions 12 which divide the annulus between the inner and the outer tube into several non-communicating sections. A plurality of olefin inlets 13 is provided in communication with alternate sections of the annulus and a plurality of solvent inlets 14 is provided for the other alternate sections. Inlets 13 can be joined to a common header or manifold, not shown, and a separate header or manifold, not shown, can be provided for solvent inlets 14.

The total effluent from the reactor passes through conduit 8 into the interior of porous reactor tube 11 and is pumped through that tube at a sufficient linear velocity to provide turbulent flow conditions and maintain the catalyst fines in suspension in the mixture. Additional ethylene can be added through inlets 13 so that the catalytic capacity of the fines is further utilized to produce polymer. The further quantities of ethylene added through inlets 13 are added at such a pressure that the ethylene readily flows through the walls of porous tube 11 into the reaction mixture passing through the interior of tube 11. This arrangement not only provides efficient contacting of the olefin and catalyst but also serves to prevent or minimize undesirable deposition of polymer and catalyst on the walls of tube 11.

Continued addition of reactant olefin to the reaction mixture and the resultant formation of increased quantities of polymer result in an increase in the concentration of polymer in the reaction mixture and, consequently, in an increase in the viscosity of said mixture, so that, as reaction proceeds, the mixture becomes increasingly difficult to pump and maintain under turbulent flow conditions. Increases in viscosity are readily discernible when the polymer concentration exceeds 5 weight percent of the reaction mixture and are especially marked when the polymer concentration exceeds 10 percent.

In order to counteract the increase in viscosity, additional quantities of solvent are added through solvent inlets 14 and forced through the walls of porous tube 11 into the reaction mixture. As previously indicated, it is preferred that the polymer concentration be maintained below 10 weight percent of the reaction mixture and preferably below 5 weight percent. The amount of solvent added through inlets 14 is, therefore, correspondingly adjusted.

The olefin added through inlets 13 and the solvent added through inlets 14 can be heated, in means not shown, to the reaction temperature of the material flowing through reactor 11. The contents of the tube 11 are maintained at a suitable reaction temperature and pressure to continue the polymerization, such temperatures and pressures ordinarily being within the reaction temperature and pressure ranges previously set forth herein. The added solvent can be heated to a temperature above that of the contents of reactor 9 or it can be added at a lower temperature than that of the reaction mixture in order to compensate for heat of reaction. The optimum preheating or cooling can readily be determined in any particular case by routine test or calculations by one skilled in the art. The effluent from reactor 9 flows through conduit 15 to separation zone 16, which ordinarily comprises a suitable arrangement of fractional distillation, filtration, evaporation, flashing, and/or cooling equipment, as discussed in more detail in the copending applications referred to herein. As an example of such an arrangement, the effluent can be heated, in means not shown, to a temperature such that substantially all of the polymer is in solution in the solvent; this solution, containing catalyst in suspension, is passed to a filter by which the catalyst is removed; the filtered solution is then passed through a series of flashing steps in which the solvent is vaporized and removed from the polymer, which is recovered as a residue. Alternatively, a settler, a clarifier, or a centrifuge, can be used instead of or in conjunction with a filter in order to remove at least part of the catalyst from suspension in the solution. Further, instead of a series of flash steps for removing the solvent from the polymer, polymer can be recovered by cooling to precipitate same and subsequently filtering the precipitated polymer from the solvent. The recovered solvent can be recycled for further use in the polymerization reaction. The catalyst fines recovered are ordinarily discarded but can be treated for recovery of the entire catalyst or any component thereof. As shown in the drawing, solvent is removed through outlet 17, catalyst is removed through outlet 18, and polymer product is removed through outlet 19. If desired, the effluent from reactor 9 can be subjected to pressure reduction or other gas-liquid separation procedure, in means not shown in the drawing, to remove any inert or unreacted gas prior to passage to zone 16. By closing conduits 13, or those nearest conduit 15, substantially complete consumption of the ethylene can be effected, and no separate subsequent gas removal step is necessary unless inert gas is present in appreciable amounts.

Annular partitions 12 can be omitted from reactor 9; however, the use of such partitions is generally preferred since they facilitate viscosity and temperature control.

Reactor 9 can be of any desired length sufficient to provide a reaction or residence time therein of from several minutes to several hours. The design and proportions of turbulence coils generally are well understood by those skilled in the art.

It will be noted that practice of this invention effects a comminution of the catalyst simultaneously with the carrying out of the polymerization reaction. Therefore, a relatively coarse catalyst can be charged to the process and, in effect, to a smaller size as a result of the polymerization reaction. This feature eliminates the necessity of fine grinding or particle size grading of the catalyst prior to charging same to the reactor.

Example

In a system of the type shown in the drawing, 4600 pounds of cyclohexane, 300 pounds of ethylene, and 11 pounds of catalyst are fed to reactor 4 per hour.

The catalyst is prepared by impregnating a steam-aged, coprecipitated gel composite comprising 90 weight percent silica and 10 weight percent alumina with an aqueous solution of chromium trioxide, drying the impregnated composite, and heating the composite at about 950° F. in a stream of substantially anhydrous air for approximately 5 hours. The catalyst, as utilized in the reactor, has a particle size from 8 to 40 mesh and a total chromium content of 2 weight percent.

The ethylene is purified by contacting with a reduced copper oxide to remove oxygen. The cyclohexane is purified by distillation to remove all material boiling below 170° F.

During the reaction, the reactor is maintained at a temperature of 250 to 300° F. and a pressure of 250 to 500 p.s.i. The reactor is provided with a stirrer which is operated at about 200 r.p.m. to aid in maintaining the coarse catalyst in suspension. The reactor is maintained substantially liquid-full during the reaction. The overall effective linear velocity of liquid flow through reactor 4 is about 1.5 inches per minute. The residence time of the catalyst in reactor 4 is approximately 2 hours. Effluent is withdrawn continuously from the top of reactor 4. This effluent comprises cyclohexane containing polyethylene dissolved therein, together with unreacted ethylene and inert gas and catalyst fines produced during the reaction and suspended in the effluent.

The effluent is passed through reactor 9, and 389 pounds per hour of additional ethylene is added in reactor 9. The 389 pounds per hour is distributed through three separate inlets in reactor 9, as indicated in the drawing. The temperature and pressure in reactor 9 are substantially the same as in reactor 4. The average residence time in reactor 9 is approximately 2 hours. The effluent withdrawn from reactor 9 contains approximately 8 weight percent polyethylene, 5 weight percent unreacted ethylene, and 0.2 weight percent of catalyst fines. The catalyst fines suspended in the effluent range in particle size from about 1 to about 125 microns, the bulk of the fines having a particle size within the range 1 to 40 microns. The fines represent the total amount of catalyst withdrawn from the reactor. The velocity of flow through the reactor is sufficient to remove substantially all catalyst finer than 100 mesh particle size. The unreacted ethylene is vented by reducing the pressure to 150 p.s.i. Additional cyclohexane is added to lower the polyethylene concentration to approximately 3 weight percent, the resulting mixture is heated to about 275° F., during agitation, to dissolve substantially all of the polymer, and the resulting solution is subjected to filtration to remove the suspended catalyst. The filtrate is subjected to vaporization conditions under vacuum to remove the cyclohexane, and polyethylene is recovered as a residue. Thus, during the entire process, 4600 pounds per hour of solvent is utilized, together with a total of 689 pounds of ethylene and 11 pounds of catalyst. A total of 5300 pounds per hour of polyethylene solution, containing 424 pounds of the polymer and 265 pounds of unreacted ethylene, is produced each hour. This represents a polyethylene yield of approximately 40 pounds per pound of catalyst. When the process is conducted in substantially the same manner but without the use of reactor 9, about 25 pounds of polyethylene per pound of catalyst is produced. Thus, it is seen that the present invention, in effect, materially increases the polymer-producing capacity of the catalyst.

While certain process steps, structures and examples have been described for the purpose of illustration, it is clear that the invention is not limited thereto. The invention provides a process wherein an olefin is polymerized in the presence of a solid catalyst and said catalyst is disintegrated during the polymerization, a reaction mixture containing suspended comminuted catalyst is recovered, and further subjected to reaction conditions in order to utilize the catalytic capacity of the comminuted suspended catalyst; and an apparatus comprising a reactor having a relatively great cross-section, a jacketed reactor having a relatively small cross-section, and settling means in communication with both said reactors and positioned between the two reactors. Variation and modification are possible within the scope of the foregoing disclosure and the claims to the invention, as will be apparent to those skilled in the art.

I claim:

1. In a process wherein an aliphatic olefin having a maximum chain length of 8 carbon atoms and no branching nearer the double bond than the 4-position is converted to normally solid polymer by contacting in a first reaction zone with a particulate solid polymerization catalyst containing chromium oxide as an essential ingredient under temperature and pressure conditions sufficient to effect such conversion, and a portion of the original catalyst particles disintegrate during the conversion and form a catalyst mixture consisting of larger particles and catalyst fines, the improvement which comprises causing the coarser particles of catalyst to settle a resulting reaction mixture, and recovering a crude reaction product mixture containing a substantial amount of said fines in suspension, introducing said mixture to a second reaction zone, maintaining said mixture in turbulent flow under temperature and pressure conditions suitable for the formation of such solid polymer, adding an olefin of the class defined, converting said olefin to such polymer, by contacting said olefin with said fines under said temperature and pressure conditions, and recovering a resulting polymer.

2. A process according to claim 1 wherein said olefin, in each instance, is ethylene, said catalyst comprises chromium oxide, including a substantial amount of hexavalent chromium, associated with at least one other oxide selected from the group consisting of silica, alumina, thoria, and zirconia, said temperature is in the range 150 to 450° F., and the pressure is sufficient to maintain the reaction mixture substantially in the liquid phase, said olefin being reacted in admixture with a hydrocarbon selected from the group consisting of paraffins and naphthenes which are inert and liquefiable under the reaction conditions.

3. A process which comprises polymerizing ethylene in a first reaction zone to form normally solid polyethylene in the presence of a particulate catalyst comprising a minor proportion of chromium oxide and a major proportion of a porous silica-alumina composite, at a temperature in the range 150 to 450° F., in the presence of a liquid hydrocarbon solvent selected from the group consisting of paraffins and naphthenes having from 5 to 12 carbon atoms per molecule, said conditions resulting in disintegration of said catalyst thereby forming a catalyst mixture consisting of larger particles and fines, maintaining said catalyst in suspension in said solvent, causing the coarser particles of catalyst to settle from a resulting reaction mixture, leaving catalyst fines in suspension in a partially clarified mixture, passing said partially clarified mixture, under turbulent flow conditions, through a second reaction zone maintained at a temperature in the range 150 to 450° F. and pressure sufficient to maintain said partially clarified mixture substantially in the liquid phase, supplying additional ethylene to said zone, reacting said additional ethylene in the presence of said fines to form normally solid polyethylene, and recovering said polyethylene.

4. A process according to claim 3 wherein additional amounts of said hydrocarbon solvent are added to said partially clarified mixture in said reaction zone to prevent substantial increase in the viscosity of said mixture above a predetermined value.

5. A process according to claim 4 wherein said additional amounts of solvent are added at a temperature sufficiently below the temperature within said reaction zone to absorb at least part of the heat of reaction.

References Cited in the file of this patent

UNITED STATES PATENTS

| | | |
|---|---|---|
| 316,381 | Meyer | Apr. 21, 1885 |
| 1,333,328 | Martin | Mar. 9, 1920 |
| 1,819,517 | Lichtenhaeler | Aug. 18, 1931 |
| 1,998,106 | Titlestad | Apr. 16, 1935 |
| 2,047,545 | Buttfield | July 14, 1936 |
| 2,271,955 | Russell | Feb. 3, 1942 |
| 2,312,719 | Kuhl | Mar. 2, 1943 |
| 2,484,384 | Levine et al. | Oct. 11, 1949 |
| 2,496,653 | Allen | Feb. 7, 1950 |
| 2,646,425 | Barry | July 21, 1953 |
| 2,688,646 | Russell | Sept. 7, 1954 |
| 2,691,647 | Field et al. | Oct. 12, 1954 |
| 2,692,261 | Peters et al. | Oct. 19, 1954 |
| 2,731,424 | Shabaker | Jan. 17, 1956 |
| 2,761,889 | May et al. | Sept. 4, 1956 |
| 2,769,772 | Gomery | Nov. 6, 1956 |